United States Patent [19]

Clark et al.

[11] 4,372,028

[45] Feb. 8, 1983

[54] METHOD OF MANUFACTURING FOAM INSULATED TANK

[75] Inventors: Keith R. Clark; Michael Focia, Jr., both of Montgomery, Ala.

[73] Assignee: Rheem Manufacturing Company, Montgomery, Ala.

[21] Appl. No.: 194,425

[22] Filed: Oct. 6, 1980

[51] Int. Cl.³ .......................................... B23K 31/02
[52] U.S. Cl. ...................................... 29/460; 264/46.9
[58] Field of Search ............... 29/460; 264/45.2, 46.5, 264/46.9, 261, 262

[56] References Cited

U.S. PATENT DOCUMENTS 3,313,020  4/1967  Krauskopf .......................... 264/46.9

Primary Examiner—Leon Gilden

Attorney, Agent, or Firm—Allegretti, Newitt, Witcoff & McAndrews

[57] ABSTRACT

A method of manufacturing a foam insulated water heater of the type having an inner tank, a layer of insulating foam material surrounding the inner tank and an outer protective shell includes, in one embodiment, the steps of (1) forming a flexible, expandable bag in a configuration which may be placed around the bottom edge of the inner tank, (2) attaching the flexible bag around the bottom edge of the tank, (3) filling the bag with a foam material which expands to form a collar, (4) positioning the outer shell about inner tank prior to expansion of the foam collar, and (5) subsequently filling the remainder of the space between the tank and the shell with an expandable foam material which is retained, at least in part, by the foam expanded, flexible bag.

8 Claims, 2 Drawing Figures

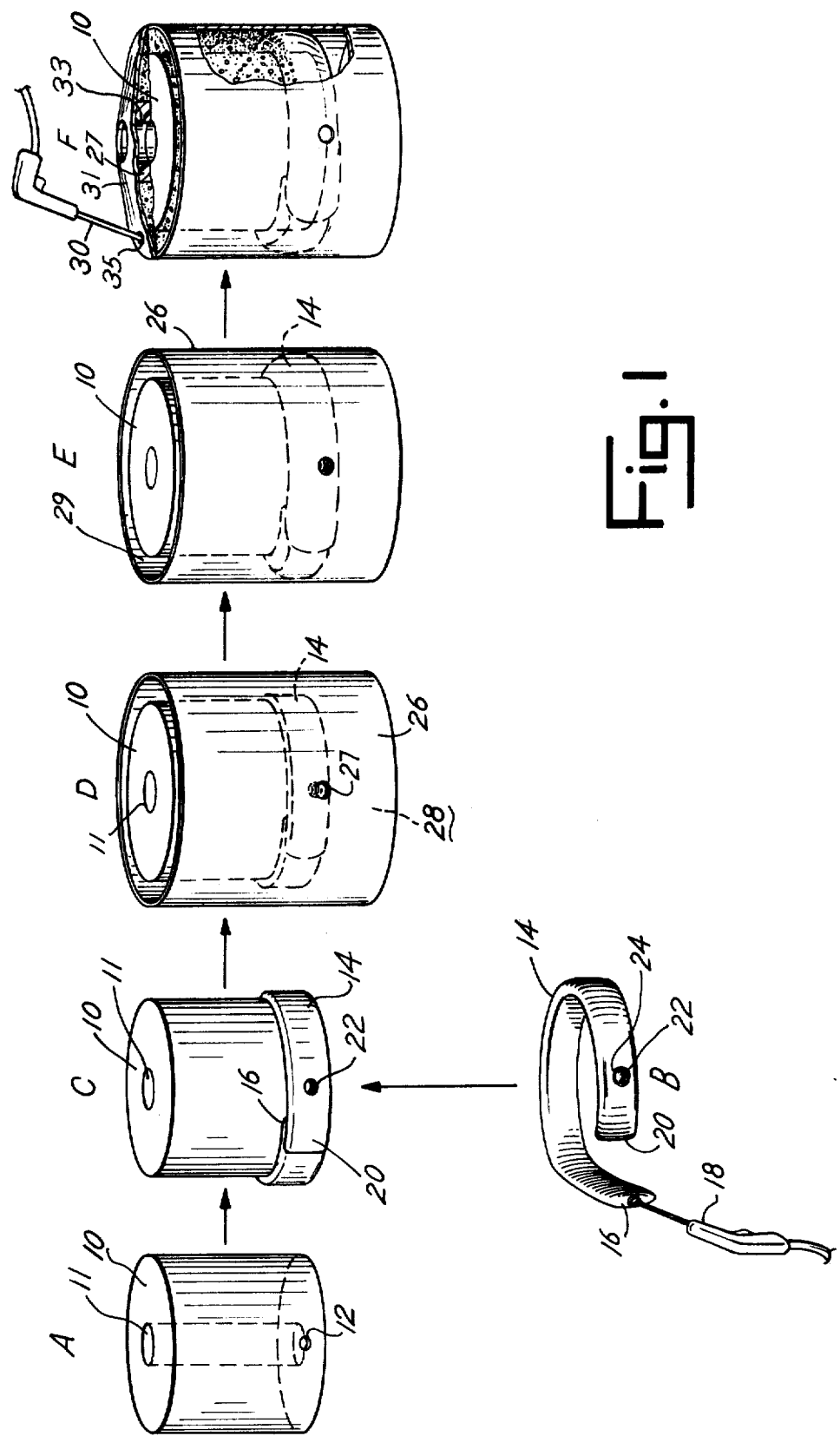

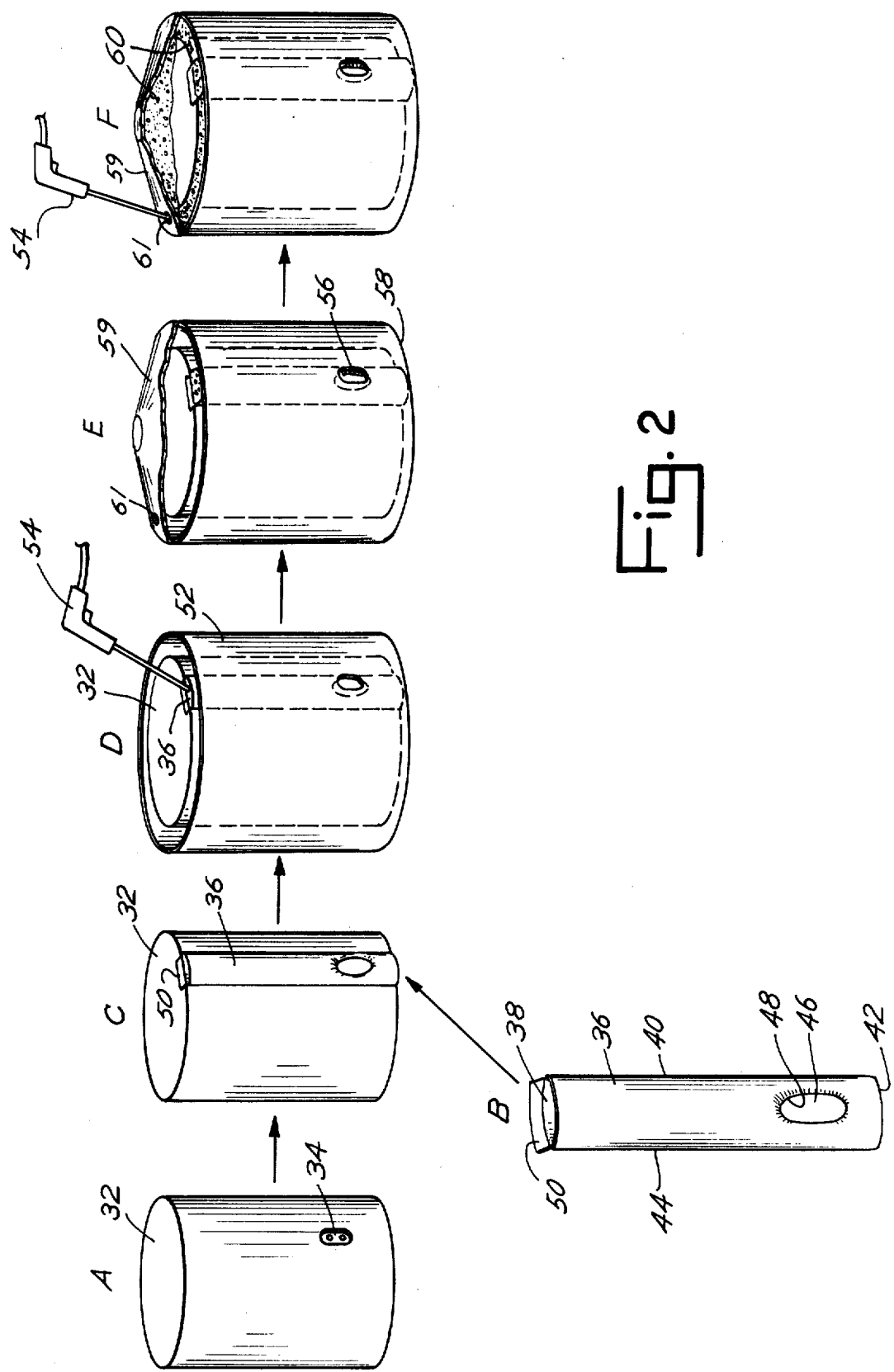

METHOD OF MANUFACTURING FOAM INSULATED TANK

BACKGROUND OF THE INVENTION

This invention relates to an improved method for the manufacture of insulated containers, particularly water heaters.

Electric and gas water heaters are generally comprised of a glass-lined, metal tank usually in the form of a cylinder which is surrounded by an insulating material retained about the tank by means of a protective, outer, sheet metal shell. In gas models, a burner compartment is normally located below the tank within the protective sheet metal shell. In electric models, a heating element normally projects through a side wall of the tank.

In order to improve the efficiency of such water heaters, it is desirable to provide external insulation for the tanks between the tank and the outer shell. Heretofore Fiberglas insulation has proven to be an excellent insulating material. More recently, expanded urethane foam has been utilized as the insulating material surrounding a water heater tank.

One of the problems associated with such a water heater assembly, particularly one having urethane foam as the insulating material, has been the method by which the foam material is formed about the tank. Generally the foam is injected as a liquid into the annular space between the inner tank and outer shell. However, it is necessary to use a core piece or other mold forming device within the space between the inner tank and outer protective shell to retain the foam within a desired region. For example, in an electric model the heating rod and controls are attached to the side wall of the tank and cannot be covered with foam.

One way of preventing foam from covering or forming over the controls has been to pack the region around the controls with Fiberglas insulation material. The Fiberglas insulation material then serves as a barrier during the foam molding operation.

Another procedure has been adopted by State Industries, Inc. of Ashland City, Tennessee. The State Industries procedure calls for forming a flexible plastic bag with an open top, closed sides and a closed bottom edge. The bag is then attached to and partially encircles the inner tank. Expandable urethane foam is next injected into the bag causing the bag to expand and fill the space between the inner tank and outer shell of the heater. In practice, the bag extends only partially around the circumference of the tank thus leaving a space or void in the region between the inner tank and outer shell defined by the opposite ends of the bag. Controls, inlets, outlets and the like then may be positioned in the void region. The spaces between the controls are appropriately packed with a Fiberglas insulation material.

The present invention is an improvement over the insulating and manufacturing methods described and permits utilization of expandable foam over substantially the entire outside surface area of a water heater tank. The method insures accurate and easily reproducible positioning of voids or spaces in the insulation through which controls, inlets, outlets and the like may be affixed to the tank. The method also eliminates usage of a large plastic bag from the manufacturing process and substitutes usage of a smaller, less expensive bag. As a result, undesired folds which may form in the large bag are avoided. Also, the insulating capability of the foam is enhanced since the foam will bond directly to the walls of the container and will not be retained in an air permeable bag. Finally, various distinct types of foam may be used in a single assembly to enhance insulation, fire retardancy and other features. These advantages, among others, are discussed in greater detail in following sections.

SUMMARY OF THE INVENTION

Briefly, the present invention comprises a method of manufacturing a multiple layer container of the type having an inner wall, an intermediate layer of expanded foam material and an outer wall. The inner and outer walls serve to retain the expanded foam material during the manufacturing process. The method comprises the steps of (1) forming a flexible, expandable bag in a configuration which may be attached to the inner wall, (2) filling the flexible bag with an expandable foam material, (3) positioning the flexible bag in the desired position on the inner wall, (4) thereafter positioning the outer wall in spaced relation and about the flexible bag and inner wall to define a space between the inner wall and outer wall, (5) waiting for the flexible bag contents to expand and form a barrier between the inner and outer walls, and (6) filling the remaining space between the walls with expandable foam utilizing the expanded, foam filled flexible bag as a portion of the mold for the additional foam. The sequence of the aforesaid steps may be altered. The configuration of the flexible bag and the position and manner of attachment to the tank may also be varied to define different sections of the mold wall. The flexible bag may also be configured to define voids or spaces in the final foam layer of the multiple layer container.

Thus it is an object of the invention to provide an improved method of manufacturing a multiple layer container of the type having an inner wall, an intermediate insulating layer and an outer protective wall.

A further object of the present invention is to provide a method of manufacturing a water heater tank having an inner metal tank, an intermediate layer of expanded urethane foam material and an outer protective shell or cover.

Still another object of the present invention is to provide a method of manufacturing a multiple layer container having improved insulating features, improved economy of manufacture, and which does not require significant capital investment in new equipment.

Another object of the invention is to eliminate the necessity of using a large tank encompassing bag to receive foam and surround the inner metal tank.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1, parts A through F, is a schematic representation of the sequential steps of a first embodiment of the manufacturing process of the present invention; and FIG. 2, parts A through F, is a schematic representation of the sequential steps of a second embodiment of the manufacturing process of the present invention.

DESCRIPTION OF THE PREFERRED EMBODIMENT

In the figures, FIG. 1, parts A-F, relate, in general, to the method of manufacture of a gas water heater. FIG. 2, parts A-F, relate, in general, to the method of manufacture of an electric water heater utilizing the method of the present invention. It is, of course, possible to utilize the techniques and method of the present invention for manufacture of other devices in addition to water heaters. The invention thus relates to the method of manufacture of any multi-layered device wherein the intermediate layers are comprised of expanded foam, for example expanded urethane foam, and the outer layers are comprised of walls which act as a mold form, at least in part, for the expanded foam material. The inner and the outer walls, of course, serve only as mold forms in forming the opposite side faces of the urethane layer. The invention relates particularly to the method for forming the end mold walls, that is, the means and method for limiting the expansion of foam in a direction transverse to the side walls.

In general, the formation of a side mold form (as opposed to a face) is effected by use of a flexible bag, for example a polyethylene bag, which is sized and configured to fit in the space between the inner and outer walls. The bag expands tightly against the inner and outer walls when the bag is filled with expandable foam material. Thus, in general, the bag is positioned between the inner and outer walls, filled with foam and permitted to expand tightly against the inner and outer walls. This permits the bag and its expanded foam contents to define an inner mold form which will limit the expansion of additional foam material injected into the space between the inner and outer walls. The flexible and expandable bags can be configured so that voids or spaces will be defined between the walls. Further details of these features are set forth with respect to the two specific examples of the invention discussed below.

Method of Manufacturing Gas Water Heater

FIG. 1 illustrates the first example of the practice of the method of the present invention as applied to manufacture of a gas water heater. Referring to FIG. 1A, a gas water heater typically includes an inner tank 10 which may be glass-lined and typically includes a center flue passage 11. The shape and size of such a tank 10 is well known. The tank 10, for example, may include a thermostat coupling 12 at its lower side. During the manufacturing operation, therefore, it is important that access be retained for the thermostat coupling 12. One or more couplings, drain connections and the like may be included. Coupling 12 is therefore by way of example.

Referring next to FIG. 1B, a flexible, polyethylene bag 14 is illustrated. The bag 14 is configured so that it is sealed on all edges except for an open end 16 for receipt of urethane foam material provided through an injector mechanism 18. All the remaining sides of the bag 14 are sealed as is end 20. The bag 14 also includes an opening 22 which is defined by a circular sealed edge 24 in the bag 14. In the configuration shown, the bag 14 is a generally elongated bag which is sufficiently long so that its opposite ends 16 and 20 will overlap when the bag 14 is positioned to surround the lower edge of the tank 10.

The bag 14 is first filled with expandable foam material. The bag 14 is then wrapped around the lower end of tank 10 so that the bag opening 22 coincides with the thermostat coupling 12. The edge 20 of the bag 14 is then taped over the open end 16 of the bag 14. In this manner, the bag 14 will be effectively sealed as a collar about the tank 10. This is illustrated in FIG. 1C.

Subsequently, referring to FIG. 1D, prior to expansion of the foam material in the bag 14, the outer shell 26 is positioned over the inner shell or tank 10 and bag 14. Note that the outer shell 26 is elongated with respect to the tank 10 thus defining a lower region 28 at least partially filled with Fiberglas beneath the bottom of tank 10 and which also serves as the region for receipt of a burner for the hot water heater tank. This region 28 includes a peripheral layer of Fiberglas filling adjacent to the wall of shell 26 for fire retardancy. Also note that shell 26 includes a port 27 which is registered with thermostat coupling 12 and opening 22. Since the shell 26 is positioned about the tank 10 and bag 14 immediately, the foam material in the bag 14 is not yet expanded.

Subsequently, as illustrated in FIG. 1E, the foam in bag 14 expands and tightly compresses the bag 14 against the tank 10 as well as the outer shell 26. Of course the opening 22 remains indexed with the coupling 12 and port 27. Thus, as shown in FIG. 1E, an open space or region 29 is formed between the outer shell 26 and the outside wall of tank 10 above the inflated collar 14.

The next steps are represented by FIG. 1F. First, an annular insulating pad 27 is placed on the tank 10 with the flue passage 11 in register with pad opening 33. Then a top pan or cover 31 is attached to the shell 26. Then an injector mechanism 30 is used to inject expandable foam material, for example urethane foam, through an opening 35 in pan 31 into the region 29 between tank 10 and outer sheet 26 above bag 14 and below pan 31. The foam material, once injected into this space, will expand and harden in the manner known to those skilled in the art to thereby form a continuous insulating layer about the tank 10. In this manner the gas water heater assembly is partially completed and ready for receipt of connecting hardware, controls, burner units and the like in the normal sequence and manner.

It is possible to fill bag 14 with a foam type distinct from that placed in region 29. Also different types of foam may be injected into region 29 in layers. Thus, foam may be varied to accommodate thermal, fire retardant and other requirements.

Method of Manufacturing Electric Water Heater

FIG. 2, parts A-F, illustrates application of the method of the present invention to the manufacture of a typical electric water heater. As shown in FIG. 2A, a tank 32 is generally cylindrical in shape having a closed top and bottom. A control panel 34 is defined in the side of the tank. Panel 34 may comprise, for example, controls as well as the electric heating rod elements which project into the interior of the tank 32.

An expandable flexible bag 36, preferably of a polyethylene plastic material is formed to receive expandable foam, for example, urethane foam. As shown in FIG. 2B, bag 36 includes a top opening 38 and sealed edges 40, 42 and 44 defining the remaining three sides of the bag 36. A void or opening 46 is defined in the bag 36 by a circular or oblong sealed edge 48. In other words, the sheets of polyethylene or plastic material forming the bag 36 are sealed along the edge 48 to define opening 46. An optional support flap 50 is defined adjacent the top opening 38.

Next, as shown in FIG. 2C, the bag 36 is affixed to the side of the tank 32. For example, the optional flap 50 may be taped to the top of tank 32 in order to support the bag 36 vertically on the outside wall of the tank 32. The bag 36 is dimensioned to extend from the top to the bottom of the tank 32. Also, the opening 46 is positioned over the panel 34. Optionally, the bag 36 may be attached to an outer shell 52 by use of hot melt glue or other adhesive for example.

FIG. 2D illustrates the next steps in the manufacture of the assembly. First, outer shell 52 is positioned over the tank 32 and bag 36. Optionally, of course, if the bag 36 is attached to the shell 52, both fit over tank 32. Note that in an electric water heater, the shell 52 has approximately the same elevational dimension as the tank 32. This results because there is no requirement for a burner section below the section 32. The shell 52 also includes an access port 56 which is placed in register with opening 46 and panel 34.

Subsequent to positioning the shell 52 with respect to the tank 32, an expandable foam material is injected into the bag 36 by means of injector mechanism 54. The foam material is then permitted to expand as illustrated in FIG. 2E. In this manner the bag 36 impinges on the opposed faces of the tank 32 and shell 52 simultaneously along a narrow longitudinal strip which fits over the panel 34. The opening 46 is maintained in proper register with the panel 34 on the tank 32 and opening 56 defined in the outer shell 52. In this manner proper access can be maintained for inserting a heating element or other controls into the tank 32. Though only one bag 36 having a single opening 46 is described, it is possible to have multiple bags having any number of openings or without openings.

As also represented by FIG. 2E, the outer shell 52 includes a lower end 58 constituting a metal shell with a block of foam material thereon. This lower end defines the bottom of a mold form which is adapted to receive further expandable foam. A top cover or pan 59 fits over the top of shell 52 and includes an opening 61 for receipt of a foam injector. Thus, as shown in FIG. 2F, the injector mechanism 54 is then used to inject foam material into the annular space between shell 52 and tank 32. This foam will flow about the tank 32 and impinge on the walls of bag 36 as well as on the bottom 58 and top 59. The foam will subsequently expand to form an insulating layer 60 in FIG. 2F which totally surrounds the tank 32.

It can be seen that the application of the method of the present invention illustrated in FIG. 2 contemplates utilization of a flexible expandable bag to again define in part the mold form in the space between a container and an outer shell. Many variations of the described method are possible. Container size and shape may vary. Expandable bag size and position may vary. The number and position of openings in the bag may vary. Thus, while there has been set forth preferred embodiments of the invention, it is to be understood that the invention is to be limited only by the following claims and their equivalents.

What is claimed is:

1. A method of manufacturing a multiple layer water tank of the type including an inner wall, an intermediate layer of expanded foam material and an outer wall comprising the steps of:
   (a) forming a flexible, expandable bag in a configuration which may be affixed about the inner wall;
   (b) forming voids in the flexible bag by sealing a passage through the bag to define open spaces in the final intermediate layer thereby facilitating assembly connections and installations from the inner wall through the outer wall;
   (c) filling the flexible bag with an expandable foam material;
   (d) immediately positioning the flexible bag circumferentially about the inner wall to define at least a portion of a mold form between the inner wall and outer wall;
   (e) aligning the void of the flexible bag with a connection to the inner wall;
   (f) thereafter immediately positioning the outer wall about the inner wall and flexible bag to define a space between the inner wall and outer wall;
   (g) orienting a connection of the outer wall with the flexible bag void;
   (h) waiting for the flexible bag contents to expand and for the bag to engage simultaneously the inner wall and outer wall and thereby define, at least in part, a mold form in the space between the walls; and
   (i) filling the space between the walls with expandable foam material and retaining said material by the expanded flexible bag and the walls.

2. The method of claim 1 wherein said water tank comprises a gas heater assembly.

3. The method of claim 1 wherein said inner wall comprises a generally cylindrical container, and said flexible bag comprises a circumferential collar for the container.

4. The method of claim 1 wherein the foam material is an insulating foam material.

5. A method of manufacturing a multiple layer water tank of the type including an inner wall, an intermediate layer of expanded foam material and an outer wall comprising the steps of:
   (a) forming a flexible, expandable bag in a configuration which may be affixed about the inner wall;
   (b) forming voids in the flexible bag through the use of sealing a passage through the bag to define open spaces in the final intermediate layer thereby facilitating post assembly connections and installations from the inner wall through the outer wall;
   (c) positioning the flexible bag longitudinally about the inner wall to define at least a portion of a mold form between the inner metallic wall and outer wall;
   (d) aligning the void of the flexible bag with a connection to the inner wall;
   (e) thereafter immediately positioning the outer wall about the inner wall and flexible bag to define a space between the inner wall and outer wall;
   (f) orienting a connection of the outer wall with the flexible bag void;
   (g) filling the flexible bag with an expandable foam material;
   (h) waiting for the flexible bag contents to expand and for the bag to engage simultaneously the inner metallic wall and outer wall and thereby define at least in part, a mold form in the space between the walls; and
   (i) filling the space between the walls with expandable foam material and retaining said material by the expanded flexible bag and the walls.

6. The method of claim 5 wherein said water tank comprises an electric heater assembly.

7. The method of claim 5 wherein said inner wall comprises a generally cylindrical container, and said flexible bag comprises a longitudinal collar for the container, said bag being installed parallel to the vertical axis of the container.

8. The method of claim 5 wherein the foam material is an insulating foam material.

* * * * *